(12) United States Patent
Ito et al.

(10) Patent No.: US 6,333,774 B1
(45) Date of Patent: Dec. 25, 2001

(54) METHOD AND SYSTEM FOR PRINTING A PAIR OF IMAGES ON OPPOSITE SIDES OF A SHEET

(75) Inventors: Atsushi Ito; Kazuhito Fukushi, both of Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/546,194

(22) Filed: Apr. 10, 2000

(30) Foreign Application Priority Data

Apr. 8, 1999 (JP) .................................................. 11-101794

(51) Int. Cl.[7] .......................... G03B 27/32; G03B 27/52; G03G 15/00
(52) U.S. Cl. .............................. 355/26; 355/24; 399/364; 399/401
(58) Field of Search .................................. 355/26, 24, 40, 355/61; 358/296; 399/364, 401

(56) References Cited

U.S. PATENT DOCUMENTS

| | | | | |
|---|---|---|---|---|
| 4,629,311 | * | 12/1986 | Kaneko et al. | ......................... 355/14 |
| 4,935,775 | * | 6/1990 | Ueda et al. | ........................... 355/202 |
| 5,822,075 | * | 10/1998 | Kaneko et al. | ....................... 358/296 |
| 6,041,205 | * | 3/2000 | Funada et al. | ......................... 399/196 |
| 6,041,213 | * | 3/2000 | Yanagi | .................................. 399/401 |

* cited by examiner

*Primary Examiner*—Russell Adams
*Assistant Examiner*—Peter B. Kim
(74) *Attorney, Agent, or Firm*—Sughrue Mion, PLLC

(57) ABSTRACT

There is disclosed a printing method and a printing system for printing a pair of images on both sides of a recording sheet. When printing a first image on a first side of a recording sheet, a printer records directional marks records on the recording sheet to indicate the direction of the first image on the recording sheet. Thereafter when the recording sheet with the first image is manually set in the printer for printing a second image on the back side, the directional marks are detected from the recording sheet to detect the posture of the recording sheet in the printer: the direction of the recording sheet with respect to the first image, as well as which side of the recording sheet is oriented for printing. If the back side is not oriented for printing, the printer stops printing the second image, and makes a warning. If it is determined based on the detected direction of the recording sheet that the second image would be printed upside down with respect to the first image, image data of the second image is processed to print the second image in an inverted direction relative to the recording sheet.

18 Claims, 14 Drawing Sheets

METHOD AND SYSTEM FOR PRINTING A PAIR OF IMAGES ON OPPOSITE SIDES OF A SHEET

BACKGROUND OF THE INVENTION

1. Field of the Invention

The present invention relates a method and a system for printing a pair of images on opposite sides of a sheet of recording material on the basis of electronic signal, wherein the recording material is to be put in a paper supply section of a printer by hand to print the image on either side of the sheet. The present invention relates more particularly to a method and a system for preventing the images from being misplaced or misprinted on the sheet.

2. Background Arts

It is well-known to print a pair of images on opposite sides of a sheet of recording paper by feeding the recording sheet twice to a printer. That is, after printing one image on one side of the recording paper, the recording paper is fed to the printer in a reversed or inverted posture for printing the other image on the other side of the recording paper. Some conventional printers are provided with mechanisms for automatically turning over the recording paper to reverse the printing side, called a convertible perfector type. But such a mechanism inevitably enlarges the printer, complicates the printer's construction and results in raising the cost of the printer.

On the other hand, where the printer does not have the automatic paper reversing mechanism, the recording paper having a first image printed on one side thereof has to be manually placed in a paper supply section of the printer again, but in a reversed posture for printing a second image on the other side. If the operator places the recording paper in a wrong posture at that time, the second image would be printed in a wrong direction, e.g. in the upside down posture. If the operator fails to turn over the recording paper, the second image would be printed on the same side as the first image (double-printing).

In order to prevent double-printing, it is known to provide a sensor for checking whether there is any image on the side to print now. However, this solution cannot prevent the second image from being printed in the wrong direction.

It has also been suggested to display an illustration instructing the correct posture of the recording paper after an image is printed on one side of the recording paper. However, if the operator neglects or overlooks the illustration, misplacement of the recording paper or misprinting of the second image cannot be prevented.

SUMMARY OF THE INVENTION

In view of the foregoing, an object of the present invention is to provide a printing method and a printing system for printing a pair of images on both sides of a recording sheet through a printer that does not have an automatic paper reversing mechanism, whereby the pair of images are prevented from being printed in a wrong direction relative to each other.

Another object of the present invention is to provide a printing method and a printing system for printing a pair of images on both sides of a recording sheet, which presents mismatching the paired images.

According to the present invention, a printing method for printing first and second images on opposite sides of a recording sheet by manually setting the recording sheet twice in a printer comprises the steps of printing the first image on a first side of a recording sheet; providing indicia on the recording sheet to indicate the direction of the first image on the recording sheet, before printing the second image on a back side of the recording sheet from the first side; detecting the indicia from the recording sheet after the recording sheet is set in the printer for printing the second image on the back side; judging based on the detected indicia whether the recording sheet is set in a proper posture or not; printing the second image on the back side when the recording sheet is in the proper posture; and giving a warning without printing any image when the recording sheet is in a wrong posture.

According to a preferred embodiment wherein the printer prints images based on electronic image data, it is judged based on the detected indicia whether the back side of the recording sheet is oriented for printing or not, as well as whether the recording sheet is in a designated direction for printing the second image in a proper direction with respect to the first image. If the back side is not oriented for printing, a warning is given, and the printer is stopped from printing. When the back side is oriented for printing, the second image on the back side. However, if the recording sheet is not in the designated direction, the image data of the second image is processed to turn the direction of the second image relative to the recording sheet so as to print the second image in the proper direction. In that case, it is preferable to calculate an offset amount for canceling any deviation of the turned image from a predetermined printing position for the second image, so the second image is printed in the predetermined printing position.

To prevent mismatching the images on opposite sides of a recording sheet, the printing method according to the present invention, further comprises the steps of allocating an identification code to image data of each image to print; inputting data of correlation between the identification code of the first image and the identification code of the second image; providing the identification code of the first image on the recording sheet along with the first image, before printing the second image on the back side; detecting the identification code from the recording sheet when the recording sheet is set in the printer for printing the second image on the back side; checking based on the correlation data if the detected identification code correlates with the identification code of the second image; giving a warning without printing the second image when these two identification codes do not correlate with each other.

According to the present invention, a printing system for printing first and second images on opposite sides of a recording sheet by manually setting the recording sheet twice in a printer, comprises a printing device included in the printer, for printing an image on one side of a recording sheet based on electronic image data; an indicia providing device for providing indicia on the recording sheet to indicate the direction of the first image on the recording sheet, before printing the second image on a back side of the recording sheet from the first side; a detection device for detecting the indicia from the recording sheet after the recording sheet is set in the printer for printing the second image on the back side; a control device for judging based on the detected indicia whether the recording sheet is set in a proper posture or not, and causing the printing device to print the second image on the back side when the recording sheet is in the proper posture.

In an embodiment, when the recording sheet is in a wrong posture, the control device stops the printing device from printing the second image and outputs a warning signal to a warning device to make a warning.

In another embodiment, the printing system further comprises a device for processing the image data of the second image to turn the direction of the second image relative to the recording sheet if the recording sheet is not in a designated direction but the back side is oriented for printing, and calculating an offset amount for canceling deviation of the turned image from a predetermined printing position for the second image, so the second image is printed in the predetermined printing position in a proper direction with respect to the first image, wherein the control device stops the printing device from printing the second image when the back side of the recording sheet is not oriented for printing.

These and other objects and advantages of the present invention and features of the present invention will become apparent from the following detailed description of the preferred embodiments when taken in conjunction with the accompanying drawings, wherein like reference numerals designate like or corresponding parts throughout the several views. The drawings are given by way of illustration only and thus are not restricting the present invention.

DETAILED DESCRIPTION OF THE EMBODIMENTS

Figure 1:
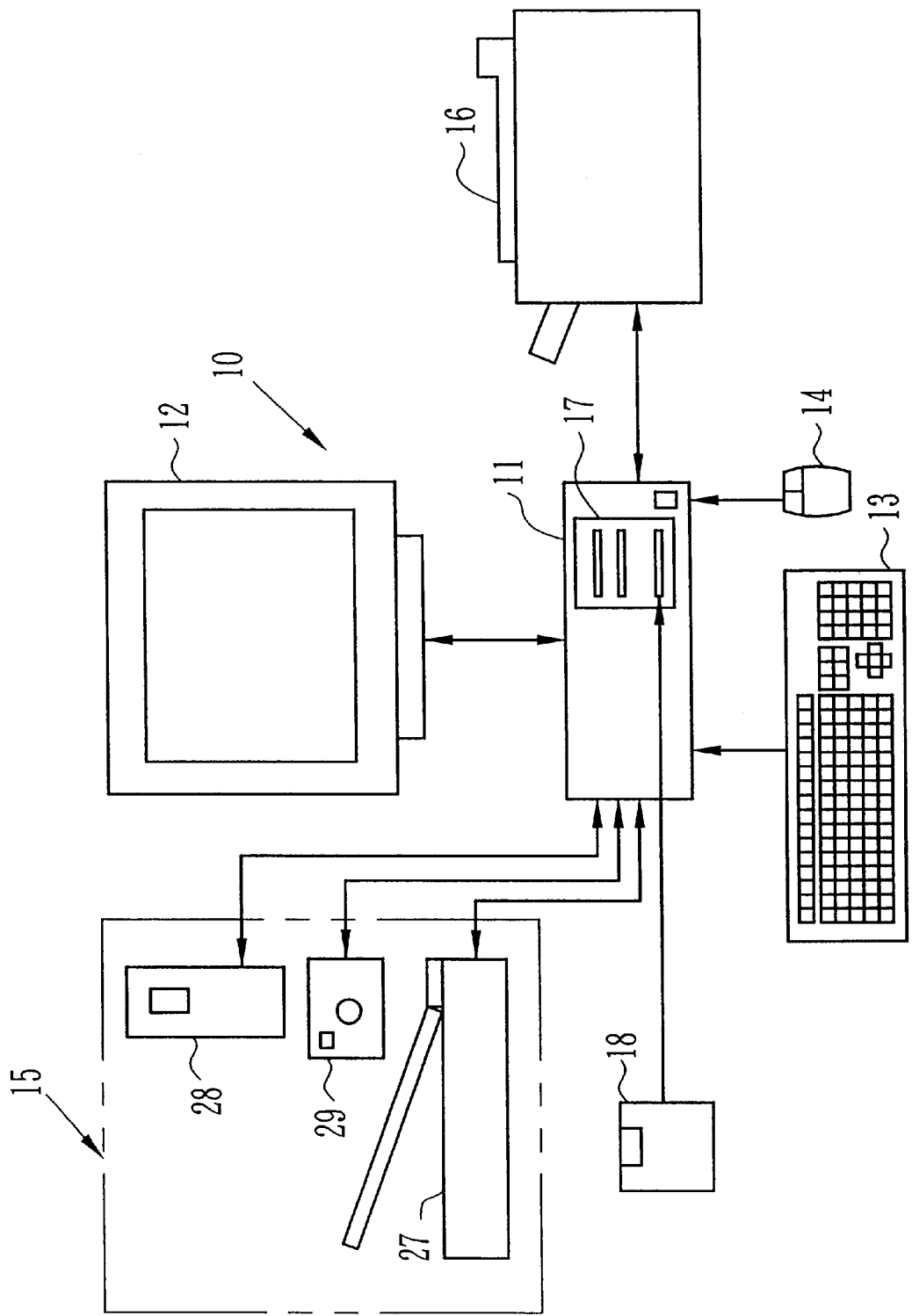
FIG. 1 is a schematic diagram illustrating a printing system according to an embodiment of the invention.

In a preferred embodiment shown in FIG. 1, a printing system 10 is constituted of a computer 11, a display 12, a keyboard 13, a mouse 14, an image input device 15, and a printer 16. The computer 11 is provided with a main memory device such as hard discs and an external memory device 17 that consists of a plurality of memory drivers such as FD disc driver, CD-ROM driver, MO disc driver. A memory medium 18 is put in one of the memory drivers. The printer 16 may be any types of digital printers that make a hardcopy of an electronic image: thermosensitive type, thermal transfer type, ink jet type, laser type, color electronic photography type and so forth, insofar as it is not of the convertible perfector type.

Figure 2:
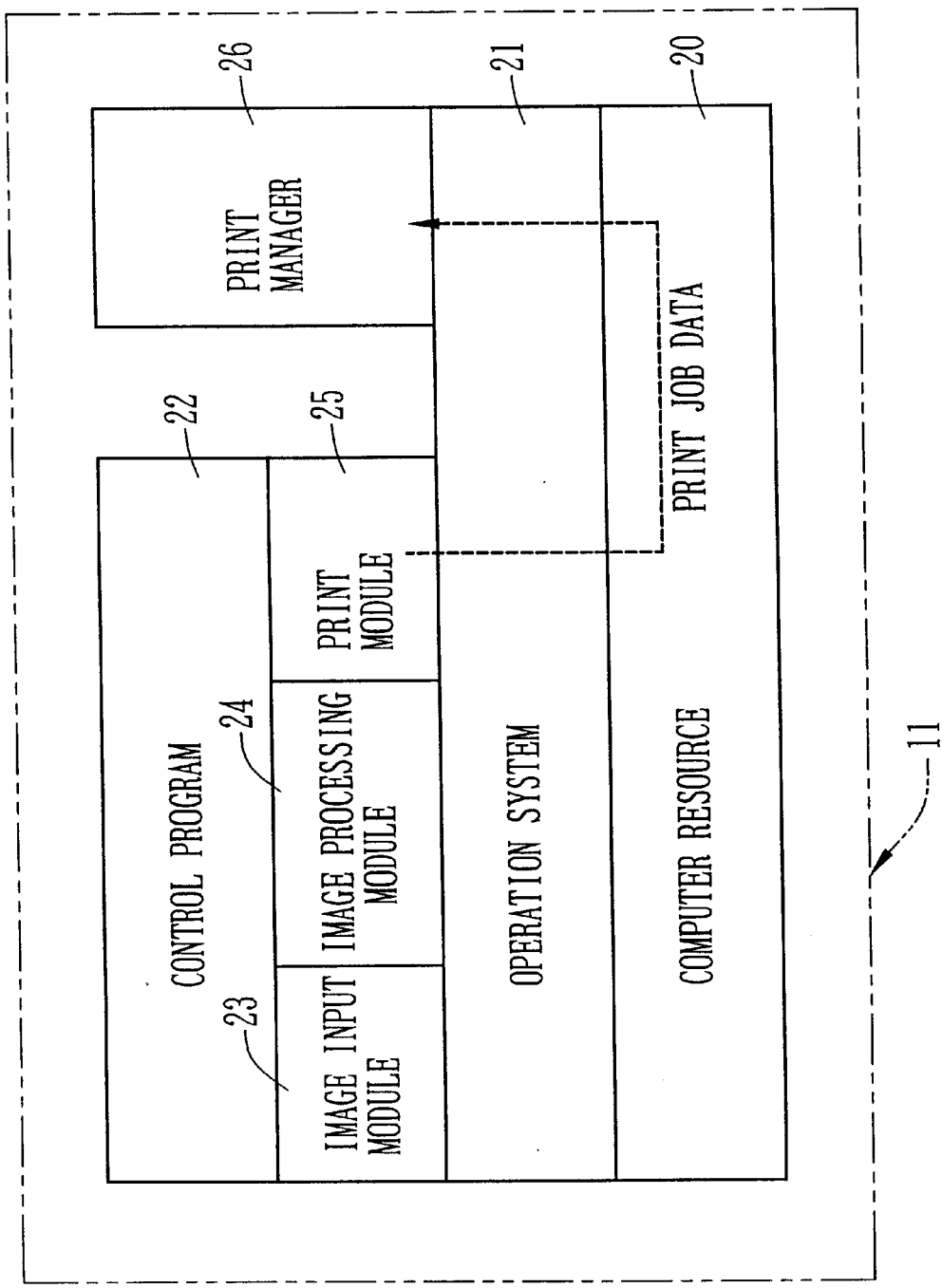
FIG. 2 is a conceptual diagram illustrating an example of computer for use in the printing system of FIG. 1.

As shown in FIG. 2, a computer resource program 20, an operation system program 21 and a control program 22 are installed in the computer 11. The control program 22 includes a variety of programs for an image input module 23, an image processing module 24 and a print module 25. The operation system program 21 includes a print manager 26, to control the printer 16 through the print manager 26.

The image input module 23 is used for feeding image data from the image input device 15 into the computer 11. According to the present embodiment, a flat head scanner 27, a film scanner 28, and a digital camera 29 are used as the image input device 15. But the image input device 15 is not limited to those options. The image data from the image input device 15 may be written on the memory medium 18, if necessary, after being processed appropriately. The image data written in the memory medium 18 may be read out through the external memory device 17.

The image processing module 24 is for synthesizing the image data with data of a template image that is chosen among from previously registered options. The operator operates the keyboard 13 or the mouse 14 for choosing and synthesizing the image data and the template image while checking the chosen images and the synthesized image on the display 12.

The print module 25 is for designating job management data for each image to be printed on one side of a recording sheet. The job management data includes the type of recording paper, the number of copies to print, and the layout of the image on the recording paper, such as the choice between both-side print and one-side print, i.e., whether an image is to print on either side of the recording sheet, or only on one side thereof. The job management data designated through the print module 25 is associated with print image data of the image to print, to produce print job data JD. The print job data JD is sent to the print manager 26 through the operation system 21.

Figure 3:
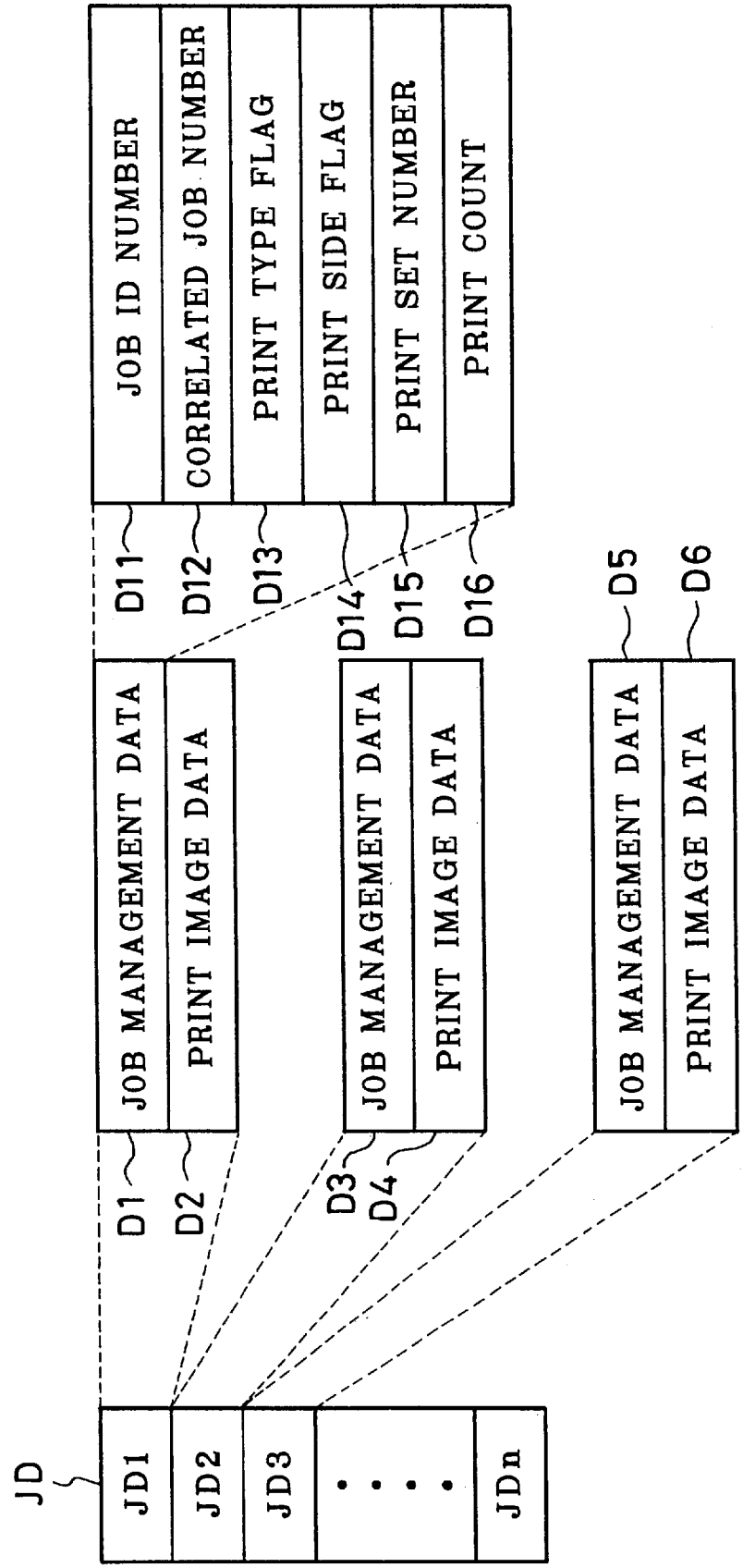
FIG. 3 is a conceptual diagram illustrating an example of print job data for use in the printing system of the present invention.

FIG. 3 shows an example of print job data JD that is constituted of a plurality of jobs JD1, JD2, JD3 . . . JDn (n=an integer). Each job consists of the print image data and the job management data associated with the print image data, and is produced for each image to print on one side. For instance, print image data D2 of the first job JD1 represents a first image to print on one side of a recording sheet, whereas print image data D4 of the second job JD2 represents a second image to print on the other or back side of the same recording sheet as the first image. In that case, both the job management data D1 of the first job JD1 and the job management data D3 of the second job JD2 include data for designating both-side print, and also data of correlation between the print image data D2 and the print image data D4. The print image data D6 of the third job JD3 represents a third image that is to be printed on another recording sheet independently of the first and second images. If the job management data D5 associated with the print image data D6 designates one-side print, the third image represented by the print image data D6 is printed solely on one side of the recording sheet.

As shown for instance with respect to the job management data D1, each job data includes a job ID number segment D11, a correlated job ID number segment D12, a print type flag segment D13, a print side flag segment D14, a print set number segment D15, and a print count segment D16. The job ID number segment D11 represents a serial number given as an ID code to each individual job JDn when the job JDn is registered. The print type flag segment D13 represents a flag for choosing between both-side print and one-side print. That is, if one-side print is designated, "0" is written as the print type flag D13. If both-side print is designated, "1" is written as the print type flag D13. The print side flag segment D14 represents a flag for choosing between the obverse or the reverse of the recording sheet. If "0" is written as the print side flag D14, the image is printed on the obverse side. If "1" is written as the print side flag D14, the image is printed on the reverse side.

The correlated job number D12 is written only when both-side print is designated by the print type flag D13, and represents a job ID number of the second job JD2 that contains the print image data D4 of the second image to be printed on the opposite side of the same recording sheet as the first image represented by the print image data D2 of the first job JD1. The job ID number D11 or D12 may be a code consisting of characters and symbols in combination with or instead of numerals.

The print set number segment D15 represents a designated number of copies to be made from the associated print image data, i.e. the print image data D2 of the first image in this instance, whereas the print count segment D16 represents the number of actually printed copies of the first image. Each time the first image is printed on one side of a recording sheet, the number is counted up in the print count segment D16 and is compared to the number written in the print set number segment D15. When the number of printed copies is counted up to the designated print set number, printing process for the first image is concluded, and the corresponding job, i.e. the first job JD1, is deleted. Thus, the designated number of copies are made from the first image.

Figure 4:
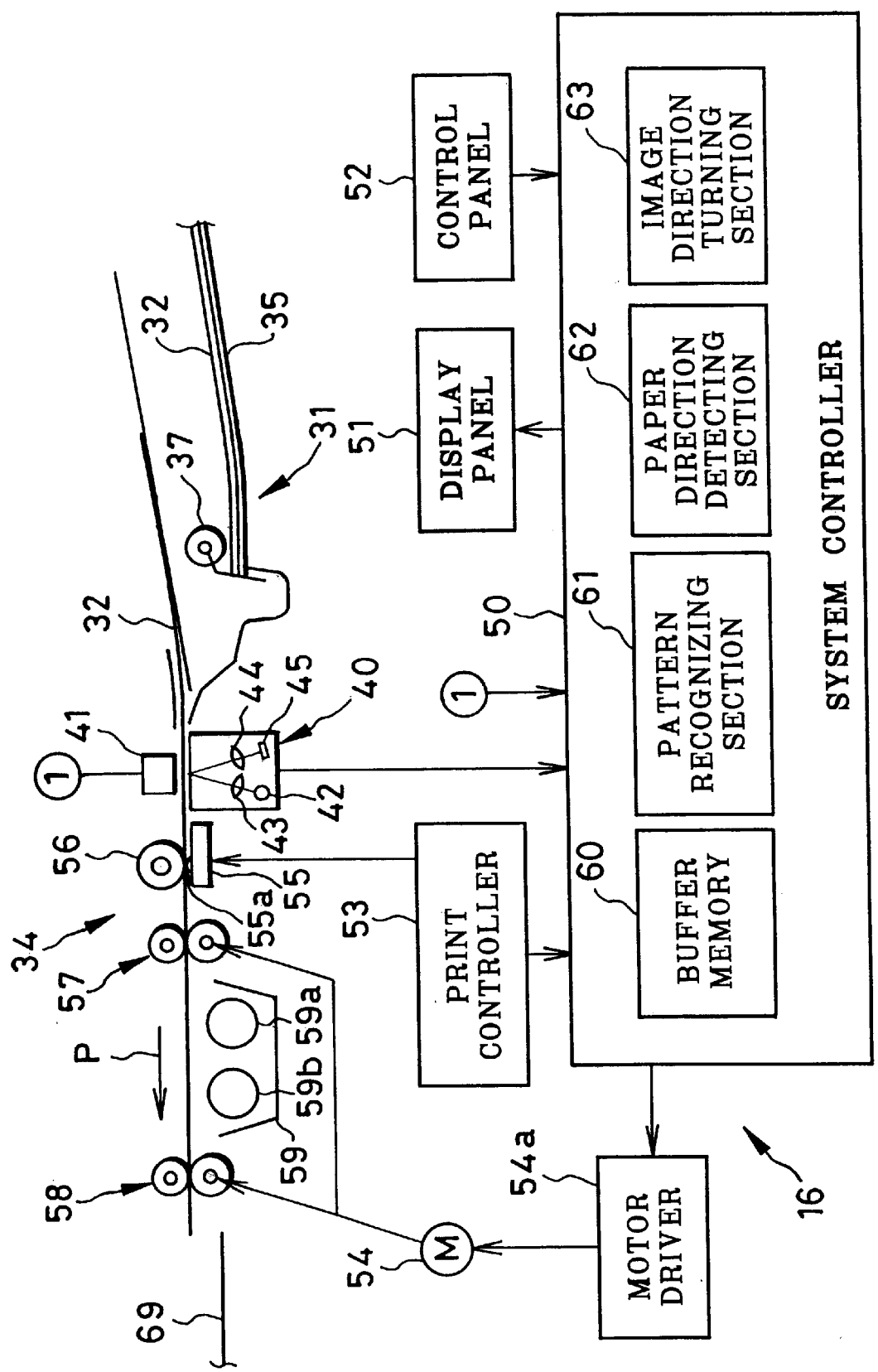
FIG. 4 is a schematic diagram illustrating an example of color thermosensitive printer for use in the printing system of the present invention.

The print manager 26 drives the printer 16 on the basis of the print job data JD received from the print module 25. FIG. 4 shows a color thermosensitive type printer as an embodiment of the printer 16 for use in the printing system 10 of the present invention.

Figure 5A:
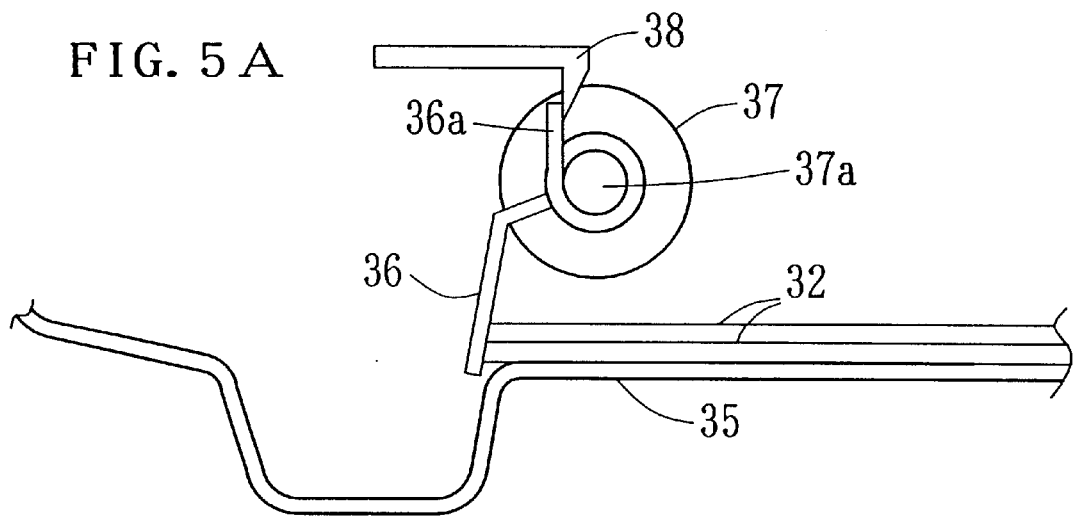
FIGS. 5A, 5B and 5C are explanatory diagrams illustrating the operation of a paper supply section of the printer of FIG. 4.

The printer 16 is provided with a paper supply section 31. As shown in FIG. 5A, the paper supply section 31 consists of a supply tray 35, a movable stopper 36 and a paper supply roller 37. Color thermosensitive recording sheets 32 are manually put in a stack on the supply tray, and are successively fed to a printing stage 34 upon the paper supply roller 37 being rotated by a not shown motor. It is of course possible to put the recording sheets 32 one by one on the supply tray 35.

Figure 5B:
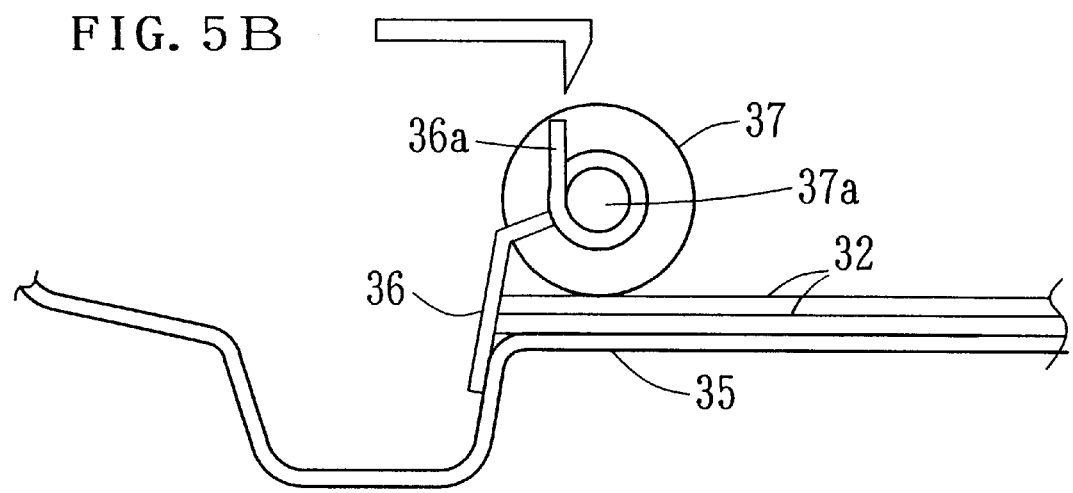
Figure 5C:
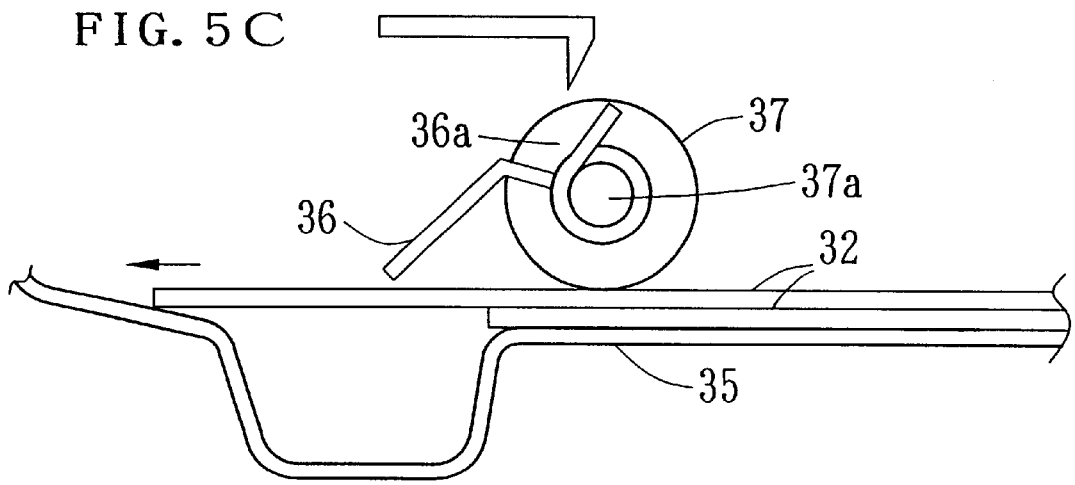

The paper supply roller 37 is disposed above a leading end of the supply tray 35 toward the printing stage 34. The paper supply roller 37 is mounted movable up and down between a retract position as shown in FIG. 5A and a feeding position as shown in FIG. 5B. In the feeding position, the paper supply roller 37 comes down to contact with a top one of the stacked recording sheets 32. As the paper supply roller 37 rotates in a paper feeding direction in this feeding position, the top recording sheet 32 is fed into the printer 16, as shown in FIG. 5C. The paper supply roller 37 is moved up to the retracted position to put the recording sheets 32 on the supply tray 35.

The movable stopper 36 is pivotally mounted on an axle 37a of the paper supply roller 37. In the retracted position of the paper supply roller 37, as shown in FIG. 5A, the movable stopper 36 is locked at a closed position where it hangs down and is in contact with a leading edge of the recording sheet 32, because a hook member 38 is engaged with a top end 36a of the movable stopper 36. When the paper supply roller 37 moves down to the feeding position, as shown in FIG. 5B, the movable stopper 36 is disengaged from the hook member 38, while keeping the closed position. As the paper supply roller 37 rotates to feed the recording sheet 32 to the printing stage 34, as shown in FIG. 5C, the movable stopper 36 flaps up to an open position by being pushed by the leading edge of the advancing recording sheet 32. It is alternatively possible to use an actuation device, such as a solenoid, for flapping the movable stopper 36 up and down between the closed and open positions. It is also possible to couple the movable stopper 36 to the paper supply roller 37 through a frictional connection, so the movable stopper 36 moves from the closed position to the open position as the paper supply roller 37 rotates in the paper feeding direction.

In the printing stage 34 along a paper feeding path, there are disposed a thermal head 55, a platen roller 56, feed roller pairs 57 and 58, and an optical fixing device 59 with a yellow fixing lamp 59a and a magenta fixing lamp 59b. These elements are controlled by a system controller 50. The system controller 50 is a well-known microcomputer. A display panel 51, a control panel 52, a print controller 53 and a motor driver 54a are connected to the system controller 50, for driving the thermal head 55 through the print controller 53, as well as for driving a motor 54 through the motor driver 54a to control rotating the feed roller pairs 57 and 58.

Under and over a section of the paper feeding path that extends from the paper supply section 31 to the printing stage 34, there are disposed image sensors 40 and 41 for picking up image signal from the bottom and top sides of the recording sheet 32 respectively. The image sensor 40 includes a light source 42, lens elements 43 and 44 and a CCD line sensor 45. The image signal is output from the CCD line sensor 45 in synchronism with the advancing of the recording sheet 32. The image sensor 41 has the same construction as the image sensor 40. The image signals from the image sensors 40 and 41 are sent to the system controller 50, after being individually amplified and converted from an analog form into a digital form.

The system controller 50 determines the direction or posture of the recording sheet 32 that is being fed to the printing stage 34, on the basis of the image signals detected through the image sensors 40 and 41. For this purpose, the system controller 50 includes a pattern recognizing section 61, a paper direction detecting section 62, and an image direction turning section 63, in addition to a buffer memory 60 for storing the print image data and other data.

Figure 6A:
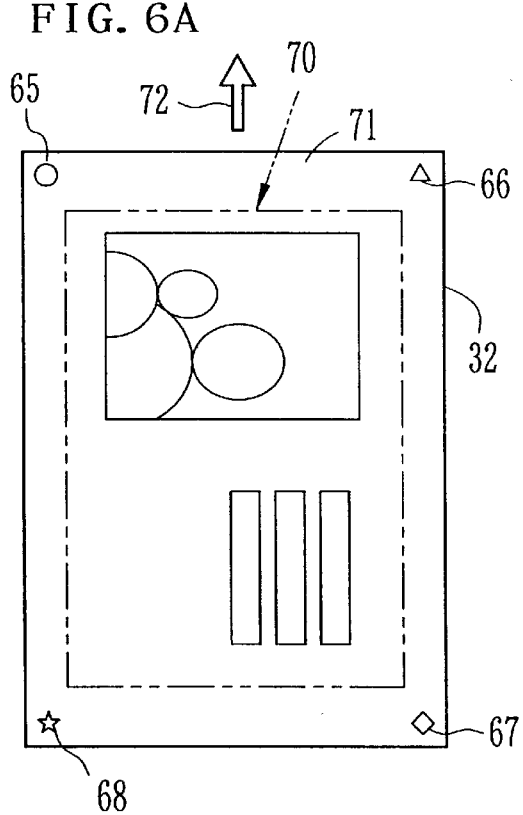
FIGS. 6A, 6B, 6C and 6D are explanatory diagrams illustrating four postures of a recording sheet having a picture and marks printed on one side thereof.

The thermal head 55 has a heating element array 55a consisting of a large number of heating elements arranged in a line. The print controller 53 controls driving the individual heating elements through a not-shown head driver in synchronism with the advancing of the recording sheet 32. The platen roller 56 presses the recording sheet 32 onto the heating element array 55a. The heating element array 55a has a length that is substantially equal to a length of the recording sheet 32 in a transverse direction to the advancing direction. This makes it possible to record indicia for indicating the directions of the recording sheet, e.g. four different marks 65 to 68 on respective corners of the recording sheet 32 as shown in FIG. 6A, or other kinds of indicia, on margins 71 around an image printing area 70 of the recording sheet 32. Image data for recording the indicia may be automatically added to the print image data in the image processing module 24 of the computer 11. As will be described in detail later, the system controller 50 detects the indicia from the image signals sent from the image sensors 40 and 41, to determine the direction or posture of the recording sheet 32 on the paper feeding path.

The feed roller pairs 57 and 58 are driven to feed the recording sheet 32 back and forth along the paper feeding path. While the recording sheet 32 is being advanced in a printing direction P, the heating element array 55a of the thermal head 55 is driven to record pixels line by line. The thermal head 55 records a full-color image on the recording sheet 32 in a three-color frame sequential fashion. For example, during the first movement of the recording sheet 32 in the printing direction P, a yellow frame is recorded on a thermosensitive yellow recording layer of the recording sheet 32, and is fixed by rays from the yellow fixing lamp 59a. During the second movement in the printing direction P, a magenta frame is recorded on a thermosensitive magenta recording layer of the recording sheet 32, and is fixed by rays from the magenta fixing lamp 59b. A cyan frame is recorded on a thermosensitive cyan recording layer as the recording sheet 32 moves in the printing direction for the third time. The magenta fixing lamp 59b stays on during the magenta frame recording, to bleach blank or uncolored portions of the recording sheet 32. The recording sheet 32 having the full-color image printed thereon is fed out onto an ejection tray 69.

Now the operation of the printer 16 for both-side printing will be described with reference to the flow charts of FIG. 7. At the start of a printing process, the display 12 shows a start menu. After confirming that the recording sheet 32 is put on the supply tray 35 of the paper supply section 31, the operator clicks an OK button of the start menu on the display 12. Then the paper supply roller 37 moves down to the feeding position and then rotates in the paper feeding direction to feed the recording sheet 32 to the printing stage 34. If the operator clicks a cancel button of the start menu on the display 12, the printing process is terminated.

While the recording sheet 32 is being fed to the printing stage 34, the first and second image sensors 40 and 41 pick up image signals from the opposite sides of the recording sheet 32, and send them to the system controller 50. Based on the image signals from the image sensors 40 and 41, the system controller 50 detects presence or absence of the recording sheet 32. If the recording sheet 32 is not detected within a predetermined time from the clicking of the OK button, an error message is indicated on the display panel 51, and the start menu is displayed again to check if the recording sheet 32 is set in the paper supply section 31. It is possible to use the image signal for checking the size of the recording sheet 32.

Also the pattern recognizing section 61 of the system controller 50 determines base on the image signals from the image sensors 40 and 41 whether there is any of the marks 65 to 68 on the recording sheet 32 and, if any, locates the positions of the individual marks 65 to 68 on the recording sheet 32.

If an image to print at present is a first one of a pair of images designated for both-side printing, and the first image is to be recorded first on the recording sheet 32, the recording sheet 32 should not have any image thereon. Therefore, if it is determined based on the results of the pattern recognition that any of the marks 65 to 68 or any other image is detected through the image sensor 40 or 41, an error message is displayed on the display 12 and the display panel 51. Simultaneously with the error message, an alarm sounds for warning. In that case, the recording sheet 32 is ejected onto the ejection tray 69 while the thermal head 55 is deactivated. It is alternatively possible to eject the recording sheet 32 back to the paper supply section 31.

If it is confirmed that the recording sheet 32 is blank, the first image is printed on a first or obverse side of the recording sheet 32, i.e. the bottom side of the recording sheet 32 in the printing stage 34 in this instance, in the three-color frame sequential fashion, as the recording sheet 32 is moved back and forth through the printing stage 34. Concurrently with the first image, the marks 65 to 68 are recorded on the four corners of the recording sheet 32 outside the image recording area 70, as shown in FIG. 6A. In FIGS. 6A to 6D, an arrow 72 shows the advancing direction of the recording sheet 32 from the paper supply section 31 to the printing stage 34, that is equal to the printing direction P in this embodiment.

Although the directional marks 65 to 68 are different kinds of symbols in the embodiment shown in FIG. 6A, it is possible to use the same kind of marks on the four corners, and differentiate the marks from each other in size or in color, or in number where the marks are provided in groups.

Figure 8:
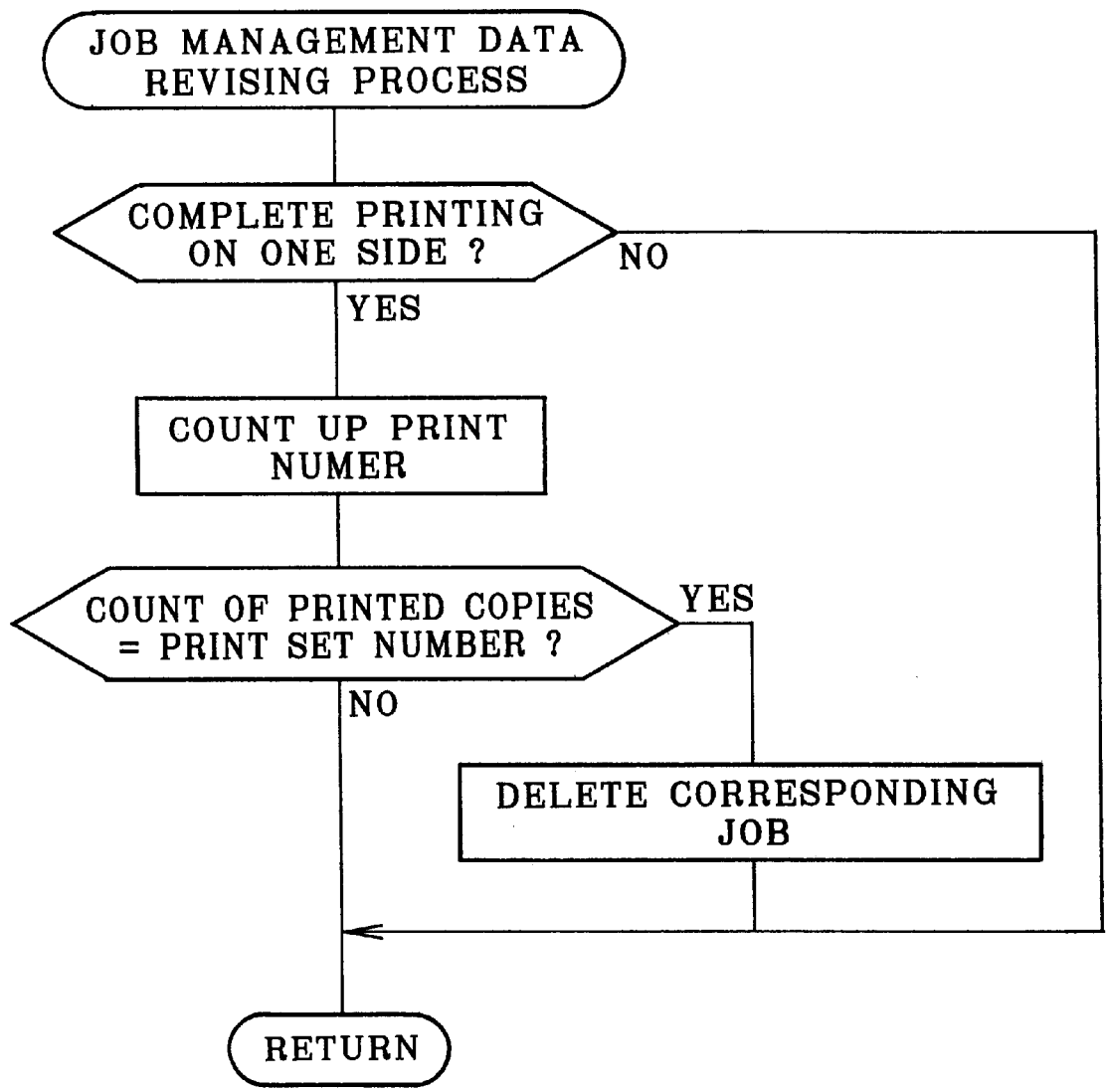
FIG. 8 is a flowchart illustrating an operation sequence for revising print management data.

Each after the first image is printed on one recording sheet 32, the system controller 50 increments the print count D16 of the job management data, and compares it to the print set number D15, as show in FIG. 8. If, for example, three hard copies having the first image and the paired second image on both sides are to be made, the first image is printed on successive three recording sheets 32. After the designated number of recording sheets 32 have the first image recorded successively on their first sides and are ejected onto the ejection tray 69, a back side printing sequence for printing a second one of the paired images onto a second or back side of the individual recording sheet 32 is commenced.

Figure 6B:
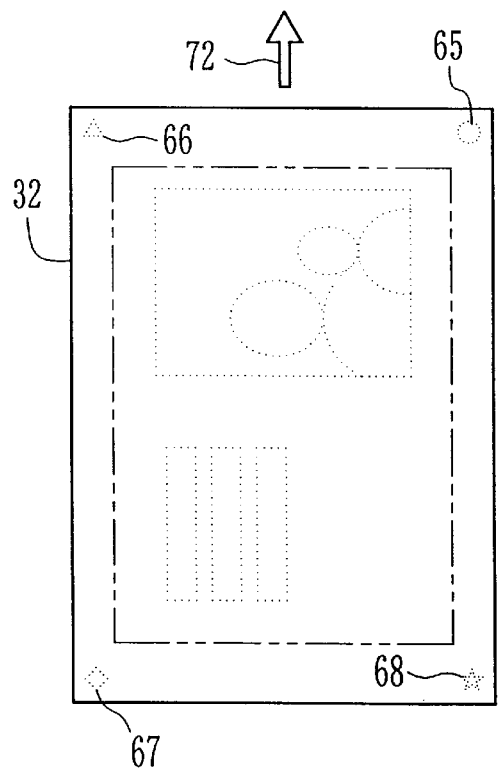
Figure 9A:
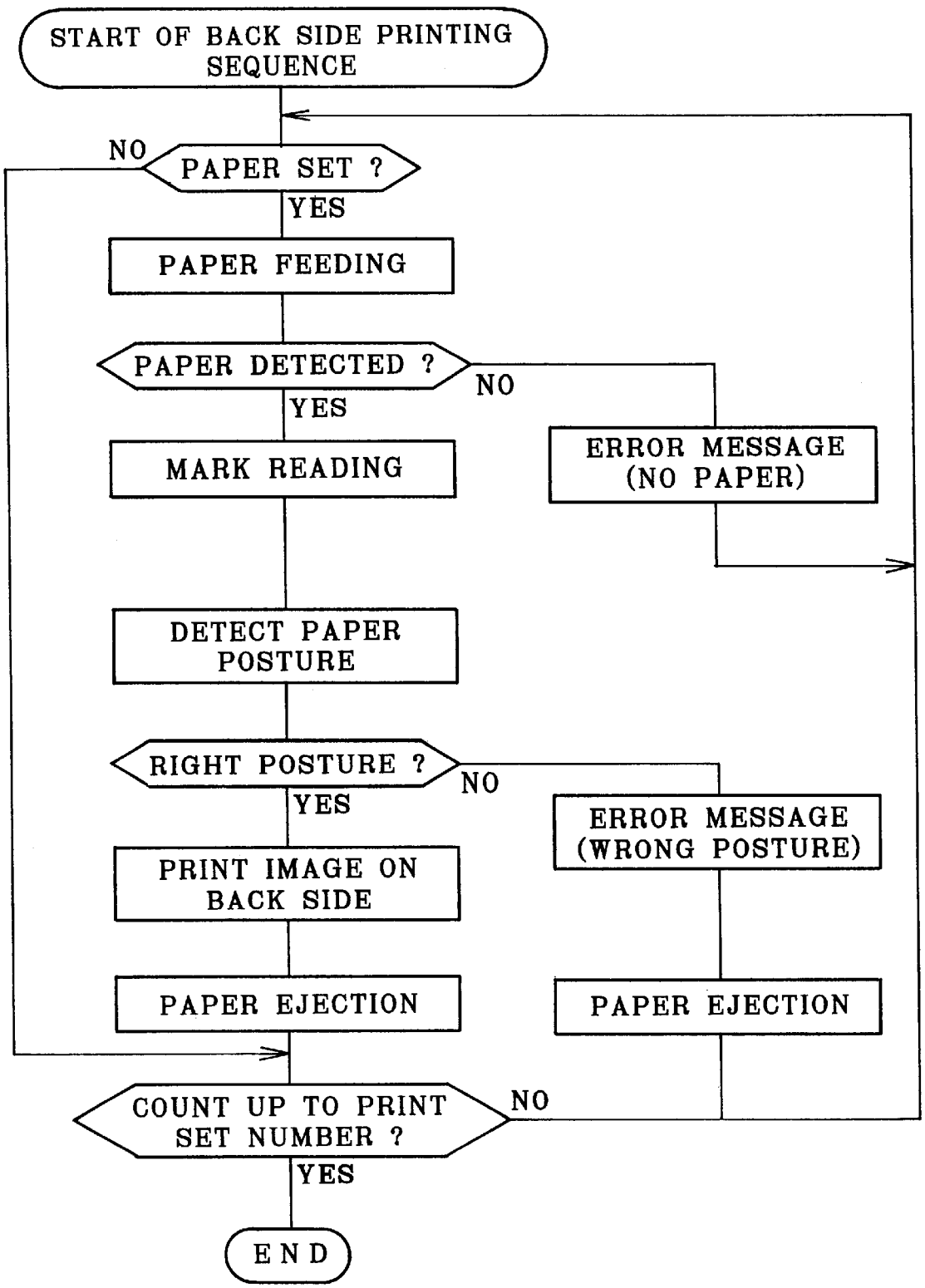
FIG. 9A is a flowchart illustrating an embodiment of a back side printing sequence of the printer for printing a second one of the paired pictures on the other side of the recording sheet, after a first one of the paired pictures is printed on one side.

An embodiment of the back side printing sequence is shown in FIG. 9A. First, the computer 11 displays an instruction and an illustration on the display 12, to instruct the operator to return these recording sheets 32 to the paper supply section 31, and show a proper direction of the recording sheets 32 on the supply tray 35 for printing the second image on the second or back side. Since the recording sheet 32 is fed into the printing stage 34 in the lengthwise direction as shown by the arrow 72 in the present embodiment, the recording sheet 32 should be placed on the supply tray 35 in a position as shown in FIG. 6B for printing the second image on the second or back side in the same direction as the first image. That is, the same end of the recording sheet 32 should be directed forward for printing the second image as for printing the first image, though the recording sheet 32 should be turned over from the position as shown in FIG. 6A. In that case, the proper posture shown on the display 12 for the back side printing corresponds to the position of FIG. 6B.

The operator picks up the recording sheet 32 from the ejection tray 69, and position it on the supply tray 35 in accordance with the illustration on the display 12. Thereafter, the operator clicks an OK button or a cancel button, which are also displayed on the display 12. Upon the OK button being clicked, the recording sheet 32 is fed to the printing stage 34 through the paper supply roller 37. While the recording sheet 32 is being fed, the marks 65 to 68 are read through the image sensors 40 and 41 and the pattern recognizing section 61. Based on the positions of the respective marks 65 to 68, the paper direction detecting section 62 detects the posture of the advancing recording sheet 32: the direction of the advancing recording sheet 32, as well as whether the second side of the recording sheet 32 is on the printing side of the printing stage 34, i.e., whether the second side is opposed to the thermal head 55.

Figure 6C:
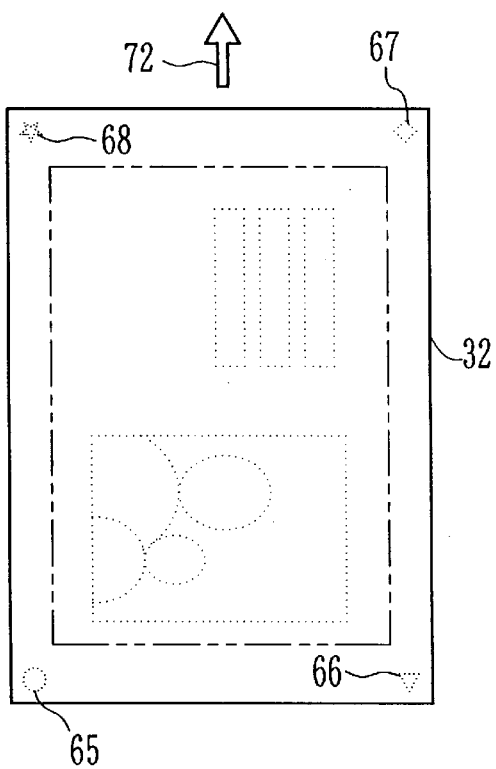
Figure 6D:
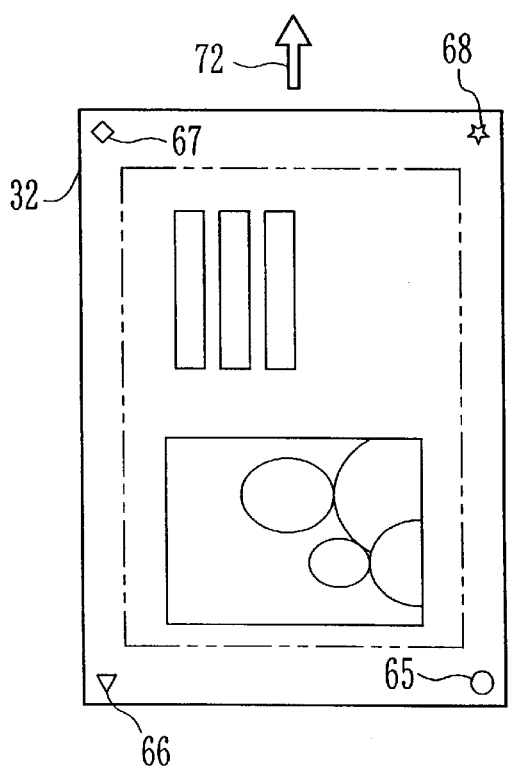

If it is determined that the recording sheet 32 is in a wrong posture, that can be a position shown in FIG. 6C or FIG. 6D or the position shown in FIG. 6A in the present embodiment, a warning process for warning the wrong direction of the recording sheet 32 is effected. That is, the an error message telling the wrong posture is displayed on the display 12, and an alarm sounds. Then, the recording sheet 32 is ejected onto the ejection tray 69 without any image being printed on the second side.

It is possible to designate the second image to be printed on the second side in the inverted direction to the first image. In that case, the proper posture of the recording sheet 32 for the back side printing is as shown in FIG. 6C. So the warning process is effected when the recording sheet 32 is fed to the printing stage 34 in the position shown in FIG. 6A, 6B, or 6D.

Instead of ejecting the recording sheet 32 to the ejection tray 69 without printing the second image, it is possible to feed the recording sheet 32 of the wrong posture back to the supply tray 32. In that case, an instruction for correcting the position of the recording sheet 32 is given on the display 12. After repositioning the recording sheet 32 on the supply tray 32, the operator can restart the printing process for the second image. When the first and second images are designated to be printed on opposite sides of a number of recording sheets 32, and the first image is printed on the plurality of recording sheets 32 in succession, the operator should correct the positions of the successive recording sheets 32 all together.

Figure 9B:
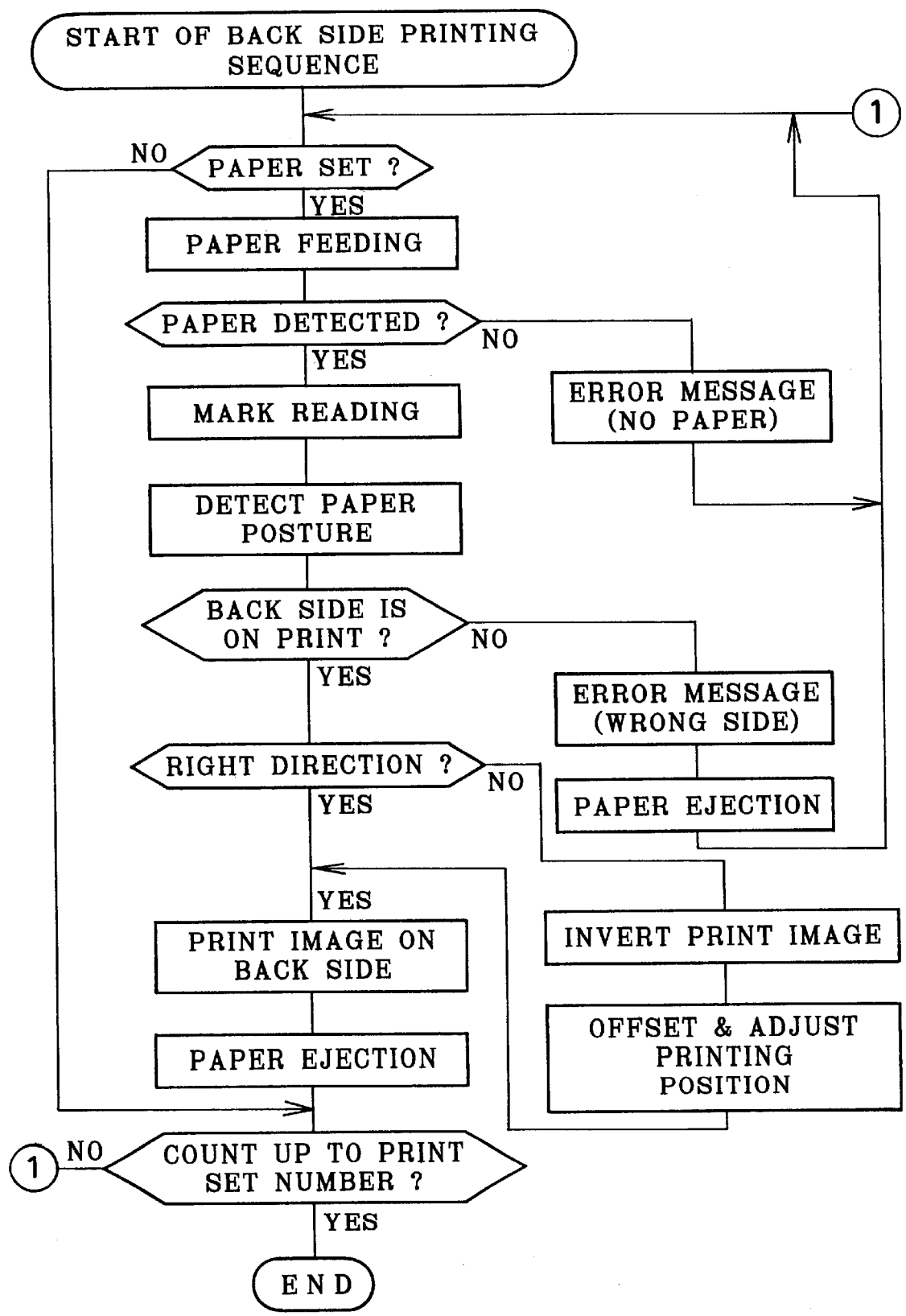
FIG. 9B is a flowchart illustrating another embodiment of the back side printing sequence of the printer.

Since the proper position for the back side printing is either the position of FIG. 6B or FIG. 6C, insofar as the recording sheet 32 is fed to the printing stage 34 in the position of FIG. 6B or FIG. 6C, even if the direction of the recording sheet 32 is wrong, it is possible to print the second image in the right posture on the second or back side by turning the second image itself upside down relative to the recording sheet 32. Therefore, according to another embodiment of the back side printing sequence, as shown in FIG. 9B, insofar as the back side of the recording sheet 32 is on the printing side opposed to the thermal head 55, the error message is not displayed even if the direction of the recording sheet 32 is wrong. Instead, the image direction turning section 63 processes print image data of the second image to invert the image direction. Simultaneously, an offset amount for canceling any deviation of the inverted image from a predetermined printing position is calculated. Thus, the thermal head 55 is driven on the basis of the processed print image data to print the second image in the predetermined position in the proper direction with respect to the first image.

According to this embodiment, it is unnecessary to reposition the recording sheet 32 on the supply tray 32 even if the direction of the recording sheet 32 for the back side printing is wrong with respect to the first image, insofar as the back side of the recording sheet 32 is on the printing side of the printing stage 34. The direction of the second image is turned by 180 degrees in the present embodiment where the recording sheet 32 is fed only in the lengthwise direction to the printing stage 34. However, where the recording sheet 32 may be fed in a widthwise direction to a printing stage, it is possible to turn the direction of the image by 90 degrees in the image direction turning section 63, to adjust the image direction to the paper direction.

Figure 7:
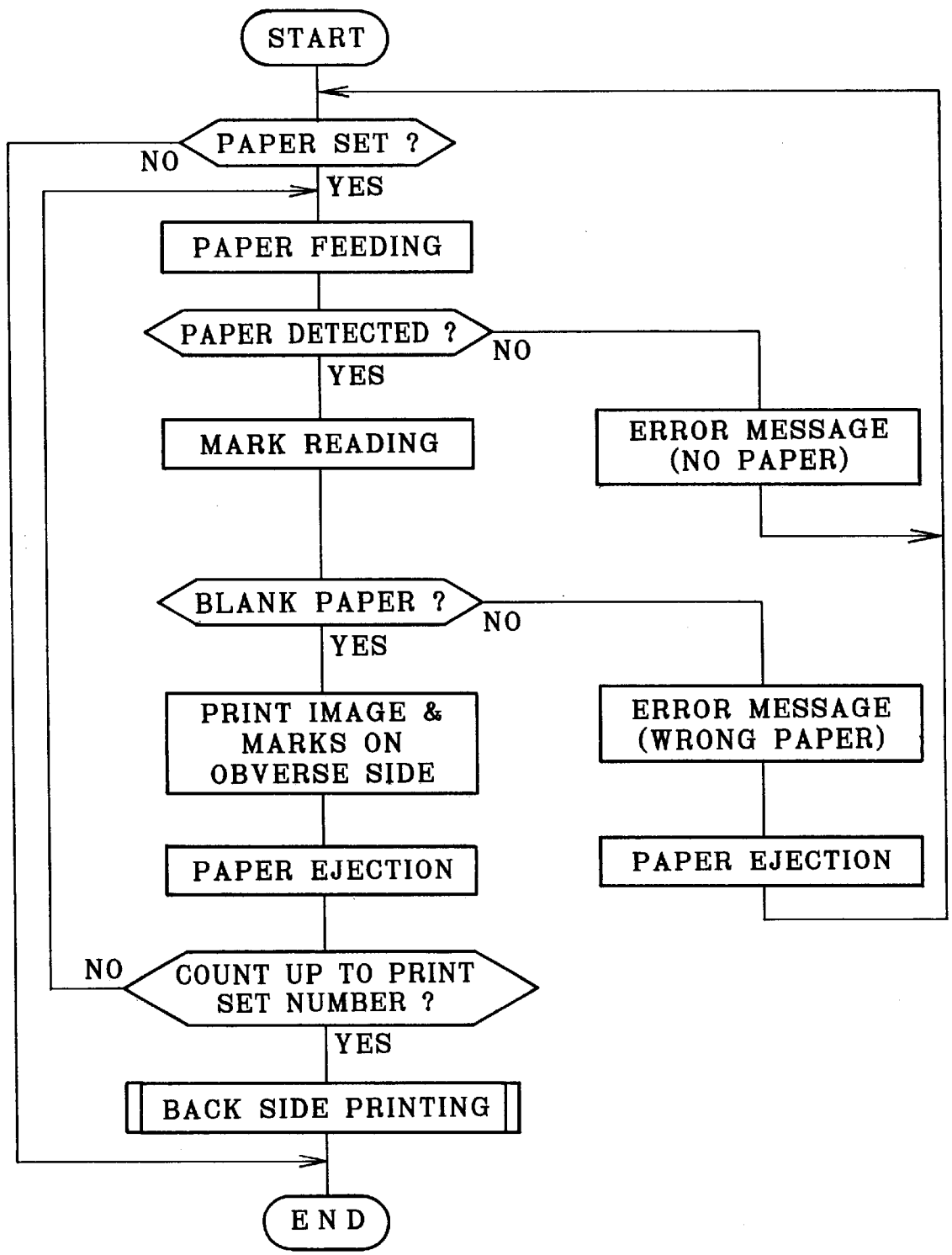
FIG. 7 is a flowchart illustrating an operation sequence of the printer for printing a pair of pictures on opposite sides of a recording sheet.

When one-side printing is designated, an image may be printed on one side of a recording sheet 32 in a similar way as shown in FIG. 7, except but the back side printing sequence is skipped. It is not also unnecessary to print the directed marks 65 to 68.

Figure 10:
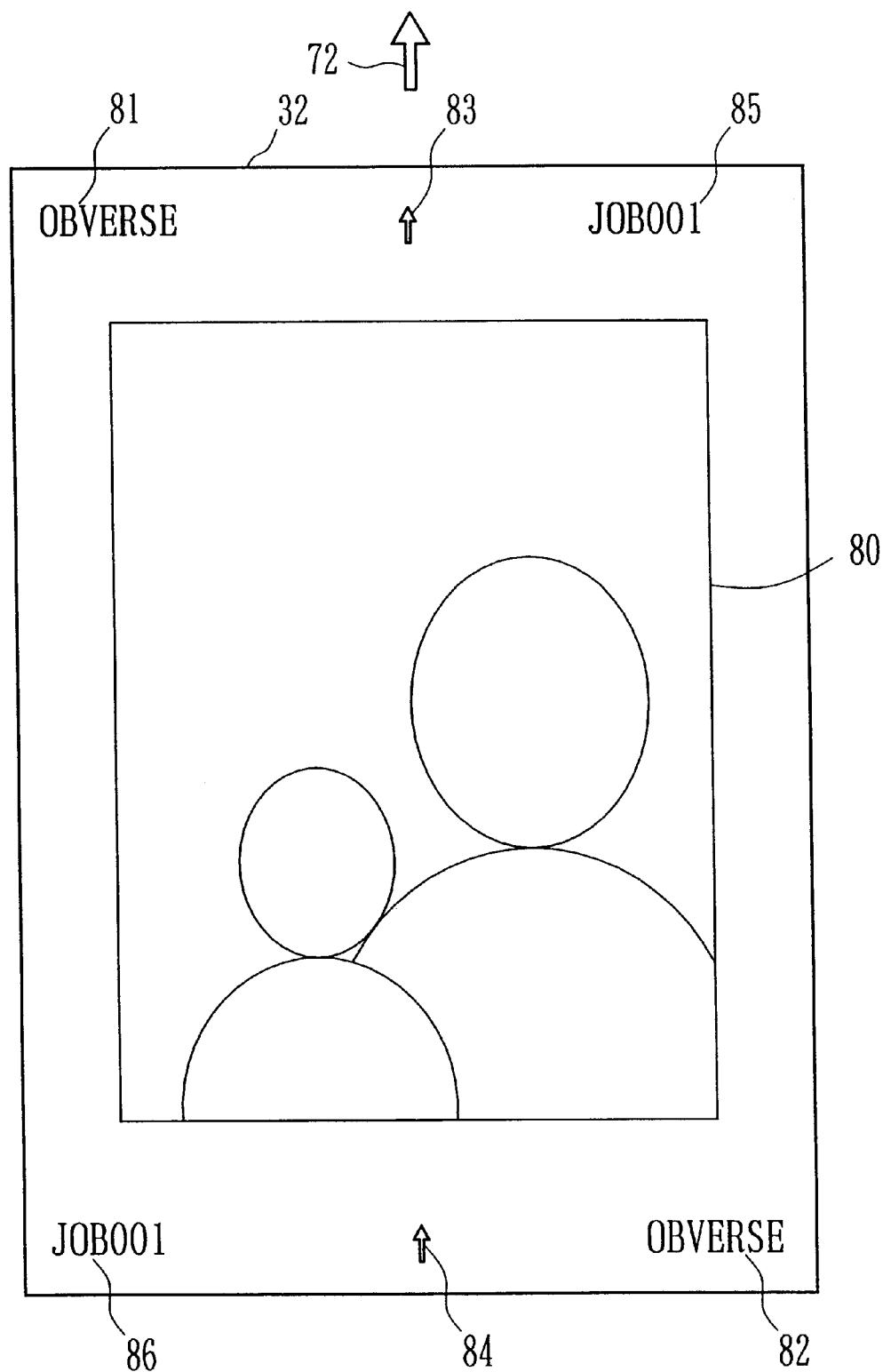
FIG. 10 is an explanatory diagram illustrating a recording sheet having a job ID number as well as directional marks printed on margins around a picture, according to a further embodiment of the invention.
Figure 11:
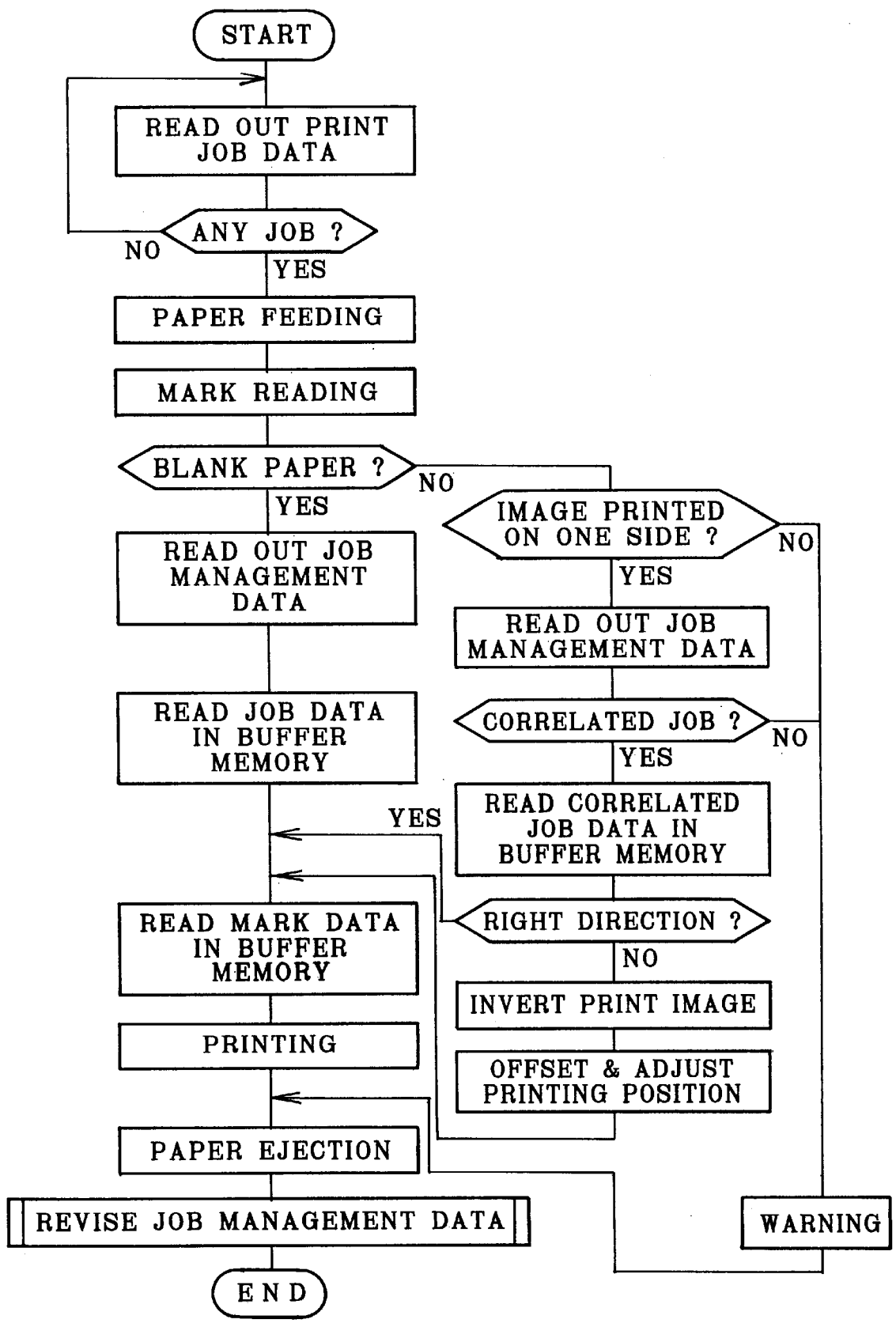
FIG. 11 is a flowchart illustrating an operation sequence according to the second embodiment of the invention.

Reference is now made to FIGS. 10 and 11 for illustrating another preferred embodiment, wherein not only the posture of the recording sheet 32 but also the content of the print image data are checked prior to printing. The following description is based on the assumption that the print job data JD and the printer 16 as shown in FIG. 4 are used in the embodiment of FIGS. 10 and 11. According to this embodiment, indicia printed on a recording sheet 32 outside an image 80 include a pair of same literal indicia 81 and 82 indicating the paper side, a pair of same directional marks 83 and 84 indicating the paper advancing direction during the printing of the first image, and a pair of same job ID numbers 85 and 86 as allocated to the printed image 80. As shown, the literal indicia 81, the directional mark 83, and the job ID number 85 are printed along a leading end of the recording paper 32 with respect to the paper advancing direction 72, whereas the literal indicia 82, the directional mark 84 and the job ID number 85 are printed along a trailing end.

While the recording sheet 32 with the image printed on its one side is being fed to the printing stage 34, image signals are picked up through the image sensor 40 or 41, so the literal indicia 81 or 82, the directional mark 83 or 84 and the job ID number 85 or 86 are extracted in the pattern recognizing section 61 from the image signals. Based on the literal indicia 81 or 82 and the directional mark 83 or 84, the direction as well as the printing side of the advancing recording sheet 32 is detected. If the paper direction or the printing side is wrong, the same warning process as described with respect to the above embodiment is executed.

The job ID number 85 or 86 is compared to a correlated job number as contained in the job management data of a second image that is being printed on the back side. If the job ID number 85 or 86 does not coincide with the correlated job number, a warning process is executed: an alarm sounds and/or an error message telling the discord between the first and second image is displayed. It is alternatively possible to retrieve such job data JD as having the correlated job number that is equal to the detected job ID number 85 or 86 from the print manager 26 and read it in the buffer memory 60, and print an image on the back side on the basis of the retrieved job data JD.

Figure 12:
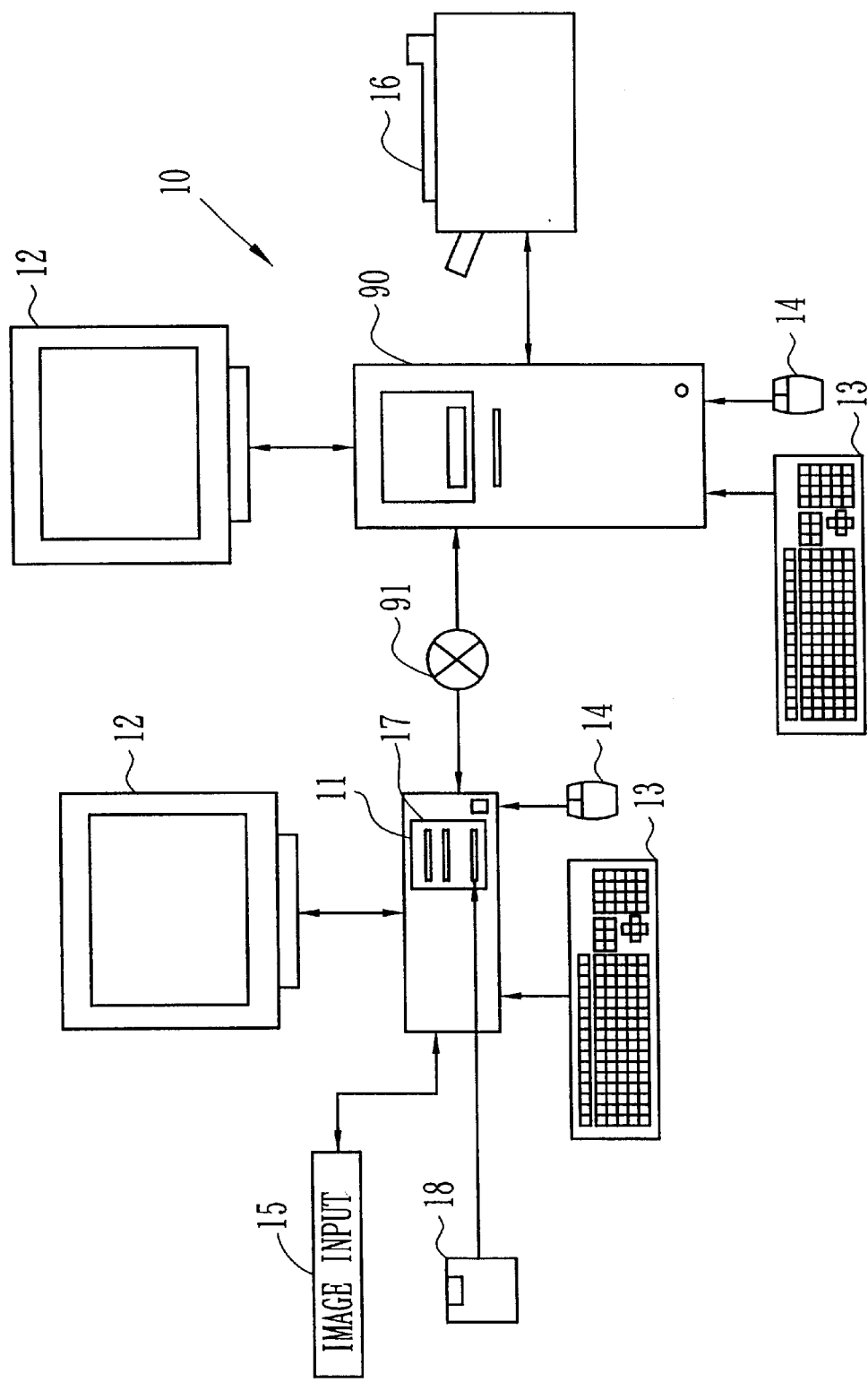
FIG. 12 is a schematic diagram illustrating a printing system according to still another embodiment of the invention, wherein a computer for image processing and a computer for print controlling are connected through a network.
Figure 13:
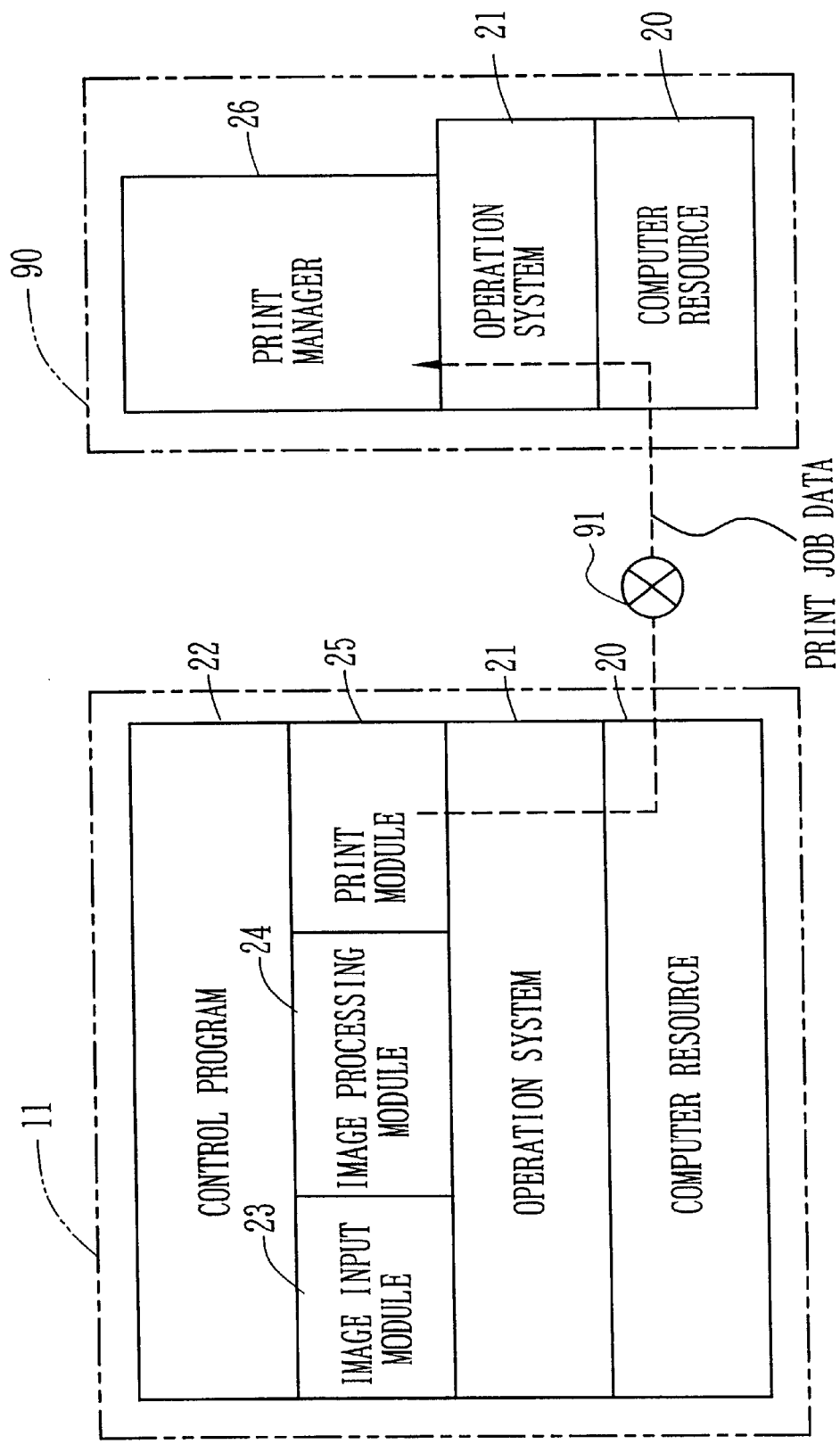
FIG. 13 is a conceptual diagram illustrating a relationship between the image processing computer and the print controlling computer.

The present invention is applicable to a printing system where a plurality of computers are connected to a network such as LAN or the Net, and at least one of the computers is connected a printer, for example, as shown in FIG. 12, wherein a computer 11 is used for image processing, whereas a computer 90 connected through a network 91 to the computer 11 is used for controlling a printer 16. As described above, the printer 16 may be any type of digital printer insofar as it is not the convertible perfector type. Other elements designated by the same reference numerals may be equivalent to those shown in FIG. 1, so a detailed description is not believed necessary for an understanding of this embodiment. It is also possible to connect an image processing computer to a plurality of print controlling computers for selectively using a plurality of printers to make hard copies of different sizes.

Although a designated number of copies are printed in succession on one sides of the recording sheets in the above embodiment, the present invention is applicable to a printer where the back side printing sequence starts each after a first image is printed on the obverse side of a recording sheet. In that case, the operator must set the recording sheet immediately after the first image is printed on one side thereof. The present invention is also applicable to a printing system that does not use the job management data.

The indicia for indicating the direction of the recording sheet may not necessarily be printed concurrently with the subject image through the same printing head, but may be provided by a stamping device, a punching device or a notching device. The marginal portion with the indicia thereon may preferably be cut off at the conclusion of both-side printing process. It is desirable to print the indicia as inconspicuous for naked-eyes as possible.

Although the indicia, including the directional marks and the job ID number, is printed as it is on the recording sheet and is detected through pattern recognition in the above embodiments, it is possible to print the indicia in the form of a bar code or other type of code, or record it as a magnetic code, in order to simplify reading the indicia.

The directional marks 83 and 84 can be a triangle mark or the like. It is also possible to detect the direction of the recording sheet with reference to the direction and position of the job ID number or the literal indicia. Instead of the literal indicia 82, date, file name or some title or caption may be used as the indicia for discriminating the side of the recording sheet. It is also possible to print the indicia inside the image.

Although the image sensors 40 and 41 use the CCD line sensor 45, to pick up image signals while the recording sheet 32 is being advanced to the printing stage 34 in the above embodiment, it is possible to detect the indicia through image area sensors while the recording sheet 32 is placed on the supply tray 35. It is also possible to use a printer which requires the operator to place a recording sheet directly on a printing stage of the printer.

The present invention may be embodied in other specific forms without departing from the spirit or essential characteristics thereof. The scope of the invention is being indicated by the appended claims rather than by the foregoing description and all changes which come within the meaning and the range of equivalency of the claims are there intended to be embraced therein.

What is claimed is:

1. A printing method for printing first and second images on opposite sides of a recording sheet by manually setting the recording sheet twice in a printer, the printing method comprising the steps of:

printing the first image on a first side of a recording sheet;

providing indicia on the recording sheet to indicate the direction of the first image on the recording sheet, before printing the second image on a back side of the recording sheet from the first side;

detecting the indicia from the recording sheet after the recording sheet is set in the printer for printing the second image on the back side;

judging based on the detected indicia whether the recording sheet is set in a proper posture or not;

printing the second image on the back side when the recording sheet is in the proper posture; and giving a warning without printing any image when the recording sheet is in a wrong posture.

2. A printing method as claimed in claim 1, wherein the indicia is provided on a margin outside the first image.

3. A printing method as claimed in claim 1, wherein the indicia is printed on the recording sheet concurrently with the first image.

4. A printing method as claimed in claim 1, wherein the indicia is detected as the recording sheet is fed from a paper supply section to a printing stage of the printer, the method further comprising the step of ejecting the recording sheet from the printing stage when the recording sheet is in the wrong posture.

5. A printing method as claimed in claim 1, further comprising the steps of checking if there is the indicia or any image on the recording sheet when a recording sheet is set in the printer for printing the first image; and giving a warning without printing the first image when there is the indicia or an image on the recording sheet.

6. A printing method as claimed in claim 1, wherein the printer prints images based on electronic image data, the printing method further comprising the steps of:

allocating an identification code to image data of each image to print;

inputting data of correlation between the identification code of the first image and the identification code of the second image;

providing the identification code of the first image on the recording sheet along with the first image, before printing the second image on the back side;

detecting the identification code from the recording sheet when the recording sheet is set in the printer for printing the second image on the back side;

checking based on the correlation data if the detected identification code correlates with the identification code of the second image; and giving a warning without printing the second image when these two identification codes do not correlate with each other.

7. A printing method as claimed in claim 6, wherein the identification code is provided on a margin outside the first image.

8. A printing method as claimed in claim 6, wherein the identification is printed on the recording sheet in the printing stage concurrently with the first image.

9. A printing method as claimed in claim 6, wherein the position or the direction of the identification code on the recording sheet is used as the indicia.

10. A printing method for printing first and second images on opposite sides of a recording sheet by manually setting the recording sheet twice in a printer that prints images based on electronic image data, the printing method comprising the steps of:

printing the first image on a first side of a recording sheet;

providing indicia on the recording sheet to indicate the direction of the first image on the recording sheet, before printing the second image on a back side of the recording sheet from the first side;

detecting the indicia from the recording sheet when the recording sheet is set in the printer for printing the second image on the back side;

judging based on the detected indicia whether the back side of the recording sheet is oriented for printing or not, as well as whether the recording sheet is in a designated direction for printing the second image in a proper direction with respect to the first image;

giving a warning without printing any image when the back side is not oriented for printing; and printing the second image on the back side when the back side is oriented for printing, wherein if the recording sheet is not in the designated direction, the image data of the second image is processed to turn the second image relative to the recording sheet so as to print the second image in the proper direction.

11. A printing method as claimed in claim 10, further comprising the steps of calculating an offset amount for canceling any deviation of the turned image from a predetermined printing position for the second image, so the second image is printed in the predetermined printing position.

12. A printing method as claimed in claim 10, further comprising the steps of:

allocating an identification code to image data of each image to print;

inputting data of correlating the identification code of the first image with the identification code of the second image;

providing the identification code of the first image on the recording sheet along with the first image, before printing the second image on the back side;

detecting the identification code from the recording sheet when the recording sheet with the first image is set in the printer for printing the second image on the back side;

checking based on the correlation data if the detected identification code correlates with the identification code of the second image; and giving a warning without printing the second image when these two identification codes do not correlate with each other.

13. A printing method as claimed in claim 10, further comprising the steps of:

allocating an identification code to image data of each image to print;

storing image data of a plurality of images in association with respective identification codes in a memory;

inputting data of correlating the identification code of the first image with the identification code of the second image;

providing the identification code of the first image on the recording sheet along with the first image, before printing the second image on the back side;

detecting the identification code from the recording sheet when the recording sheet is set in the printer for printing the second image on the back side;

reading out image data of the second image as having the correlated identification code with the detected identification code from the memory with reference to the correlation data; and printing the second image on the basis of the image data read out from the memory.

14. A printing system for printing first and second images on opposite sides of a recording sheet by manually setting the recording sheet twice in a printer, the printing system comprising:

a printing device included in the printer, for printing an image on one side of a recording sheet based on electronic image data;

a device for providing indicia on the recording sheet to indicate the direction of the first image on the recording sheet, before printing the second image on a back side of the recording sheet from the first side;

a detection device for detecting the indicia from the recording sheet when the recording sheet is set in the printer for printing the second image on the back side; and a control device for judging based on the detected indicia whether the recording sheet is set in a proper posture or not, and causing the printing device to print the second image on the back side when the recording sheet is in the proper posture.

15. A printing system as claimed in claim 14, wherein when the recording sheet is in a wrong posture, the control device stops the printing device from printing the second image and causes a warning device to make a warning.

16. A printing system as claimed in claim 14, further comprising a device for processing the image data of the second image to turn the second image relative to the recording sheet if the recording sheet is not in a designated direction but the back side is oriented for printing, and calculating an offset amount for canceling deviation of the turned image from a predetermined printing position for the second image, so the second image is printed in the predetermined printing position in a proper direction with respect to the first image, wherein the control device stops the printing device from printing the second image when the back side of the recording sheet is not oriented for printing.

17. A printing system as claimed in claim 14, further comprising:

a device for allocating an identification code to image data of each image to print;

a device for inputting correlation data for correlating the identification code of the first image with the identification code of the second image;

a device for providing the identification code of the first image on the recording sheet along with the first image, before printing the second image on the back side; and a device for detecting the identification code from the recording sheet when the recording sheet is set in the printer for printing the second image on the back side, wherein the control device checks with reference to the correlation data if the detected identification code correlates with the identification code of the second image, and stops the printing device from printing the second image and causes the warning device to make a warning when these two identification codes do not correlate with each other.

18. A printing system as claimed in claim 15, further comprising:

a device for allocating an identification code to image data of each image to print;

a memory for storing image data of a plurality of images in association with respective identification codes;

a device for inputting correlation data for correlating the identification code of the first image with the identification code of the second image;

a device for providing the identification code of the first image on the recording sheet along with the first image, before printing the second image on the back side;

a device for detecting the identification code from the recording sheet when the recording sheet is placed in the printer for printing the second image on the back side; and a device for reading out image data of the second image, as having the correlated identification code with the detected identification code, from the memory with reference to the correlation data, so that the second image is printed on the basis of the image data read out from the memory.

* * * * *